(12) United States Patent
Belvin et al.

(10) Patent No.: US 6,500,370 B1
(45) Date of Patent: *Dec. 31, 2002

(54) PROCESS OF MAKING BORON-FIBER REINFORCED COMPOSITE TAPE

(75) Inventors: Harry L. Belvin, Hayes, VA (US); Roberto J. Cano, Yorktown, VA (US); Norman J. Johnston, Williamsburg, VA (US); Joseph M. Marchello, deceased, late of Hampton, VA (US), by Louise C. Marchello, legal representative

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 95 days.

This patent is subject to a terminal disclaimer.

(21) Appl. No.: 09/620,274

(22) Filed: Jul. 18, 2000

(51) Int. Cl.[7] .................. B29C 67/00; B29C 69/00; D04H 3/08
(52) U.S. Cl. .................. 264/85; 156/180; 156/181; 156/298; 264/136; 264/137; 264/171.13
(58) Field of Search .................. 264/85, 136, 137, 264/171.13; 156/180, 181, 298

(56) References Cited

PUBLICATIONS

Belvin, H.L. et al. "Fabrication of Carbon–Boron Reinforced Dry Polymer Matrix Composite Tape", 31st SAMPE Technical Conference, Chicago, Illinois, Oct. 27–31, 1999.*

* cited by examiner

Primary Examiner—Leo B. Tentoni
(74) Attorney, Agent, or Firm—Kurt G. Hammerle

(57) ABSTRACT

The invention is an apparatus and method for producing a hybrid boron reinforced polymer matrix composition from powder pre-impregnated fiber tow bundles and a linear array of boron fibers. The boron fibers are applied onto the powder pre-impregnated fiber tow bundles and then are processed within a processing component having an impregnation bar assembly. After passing through variable-dimension forming nip-rollers, the powder pre-impregnated fiber tow bundles with the boron fibers become a hybrid boron reinforced polymer matrix composite tape. A driving mechanism pulls the powder pre-impregnated fiber tow bundles with boron fibers through the processing line of the apparatus and a take-up spool collects the formed hybrid boron-fiber reinforced polymer matrix composite tape.

11 Claims, 9 Drawing Sheets

PROCESS OF MAKING BORON-FIBER REINFORCED COMPOSITE TAPE

CROSS REFERENCE TO RELATED APPLICATIONS

This application is related to commonly owned, co-pending patent application Ser. No. 09/185,142, filed Nov. 3, 1998, Ser. No. 09/346,464, filed Jul. 1, 1999, and Ser. No. 09/591,384, filed Jun. 8, 2000.

ORIGIN OF INVENTION

The invention described herein was jointly made by employees of the United States Government and a contract employee during the performance of work under NASA Contract NAS1-19858. In accordance with 35 USC 202, the contractor elected not to retain title.

BACKGROUND OF THE INVENTION

1. Field of the Invention

This invention relates generally to the preparation and fabrication of prepreg tapes and ribbons for automated tow placement and relates specifically to the preparation of polyimide resin/carbon fiber/boron fiber unidirectional solvent-free tape and ribbon having encapsulated boron fibers evenly distributed throughout the tape or ribbon.

2. Description of the Related Art

Automated tow placement (ATP) is a process where composite ribbons or tapes are robotically managed and continually fed onto a tool or part surface and adhered by the application of heat and pressure. ATP is particularly sensitive to the quality of the composite ribbon when working with low-flow matrix materials. The simultaneous assembly of adjacent ribbons (typically 4 to 34) or wide tape offers significant advances in the lay-up of composite materials. However, ribbons or tapes made from low-flow matrix materials typically lack a cross-sectional dimensional integrity, and more importantly, a standard rectangular cross-section. These structural defects complicate the ATP process and frequently render poor results. Although ribbons are bonded to their vertical neighbor (directly below) satisfactorily, the failure to make quality parts is generally attributed to the poor bonding of adjacent ribbons to each other and the quality of tape being used. Low-flow thermoplastic parts made by using slit prepreg tapes are typically unconsolidated and exhibit excessive porosity and void content.

Ideally, tapes used in the ATP process should be fully consolidated. Consolidation means the voids in a composite material have been eliminated during melt-processing. One method of accomplishing consolidation is pultrusion. This technique requires full ingestion of the unconsolidated composite material within an enclosed die with an exit area less than the inlet area. Pultrusion has a slow production rate.

Another method of accomplishing some consolidation is disclosed by Sandusky in U.S. Pat. Nos. 5,395,47. Sandusky discloses an apparatus and method for providing a consolidated, unidirectional, continuous, fiber-reinforced composite ribbon. The apparatus includes a pre-melting chamber, a stationary bar assembly, and a loaded, cooled nip-roller apparatus. Examples given by Sandusky discuss the manufacture of ribbons having a width of 0.250 in. and three inches.

Sandusky employs a number of techniques which make the fabrication of a uniform, fully consolidated three-inch wide tape difficult. First, the shaping means has a fixed gap between its rollers which leads to the fabrication of material with a fixed cross-section. Without the adaptiveness of a variable cross-section, a precise uniform-shaped tape or ribbon will be produced only if enough composite material is fed through the forming device to fill the fixed opening. During periods when the powder content of the fiber tow drops below the desired amount, the shape of the tape or ribbon becomes irregular and jagged, which facilitates the generation of voids.

Second, Sandusky lacks a collimation device for maintaining the orientation of each individual fiber tow bundle. Such a device is essential in the manufacture of a uniform product with respect to thickness. If the individual tows are out of alignment they can overlap and create a tape which is not a consistent thickness across its width.

Third, the lack of a dedicated drive component for the processing line is a critical problem. The tows need to maintain a zero speed differential across the width of the tape during processing. If the individual tows are moving at differing velocities, the tape will not combine and consolidate. Accordingly, a process for producing a fully-consolidated, uniform tape is desired. One example of a dry powder impregnation method is disclosed in U.S. patent application Ser. No. 09/185,142, filed Nov. 3, 1998, entitled Method and Apparatus to Fabricate a Fully-Consolidated Fiber-Reinforced Tape from Polymer Powder Preimpregnated Fiber Tow Bundles for Automated Tow Placement (Belvin et al.), the disclosure of which is herein incorporated by reference. U.S. patent application Ser. No. 09/185,142 discloses the manufacture of a three-inch wide product from powder pre-impregnated fiber-tow bundles.

Typically, carbon fiber composites can provide excellent mechanical properties. However, in certain applications carbon fiber alone does not provide adequate compressive strength. A solution to this problem is the hybridization of carbon fiber composites with boron reinforcing fibers.

Current technology for making boron/carbon prepreg and composites from polyimides includes utilizing solution coated prepreg with residual solvent. Boron fibers are calendered onto "wet" prepreg to make a hybrid boron/carbon fiber prepreg. This technique only pushes the large diameter boron fibers partially into the "wet" prepreg. The resultant prepreg contains boron fibers that are essentially sitting on the prepreg surface and are not fully encapsulated within resin. This material also requires solvent removal during cure, a process which is labor intensive and costly.

The need for a technique to process high temperature polyimides into composites without a solvent is apparent. The hazards and expense of solvent removal and recovery are critical to this composite technology. Developing a dry polyimide tape will allow for ATP by a robot and will significantly reduce the cost of processing composite materials into parts. A process which utilizes significantly less or no solvent and results in a higher quality intermediary and end product is essential to the use of these polyimide composites in large quantities.

SUMMARY OF THE INVENTION

Accordingly, an object of the present invention is to manufacture a hybrid boron reinforced polymer matrix composition.

Another object is to manufacture a hybrid boron reinforced polymer matrix composition of consistent thickness across its width.

Another object of the invention is to manufacture a hybrid boron reinforced polymer matrix composition with minimal voids therein.

Still another object of the present invention is to manufacture a hybrid boron reinforced polymer matrix composition having geometric accuracy regardless of changes in the powder content along the length of the fiber tow bundles.

The foregoing and additional are attained by providing a method of producing a consolidated, hybrid boron-carbon fiber-reinforced composite tape comprising the steps for dispensing at least one linear array of boron fibers; sandwiching the dispensed linear array of the boron fibers with a plurality of powder pre-impregnated fiber tow bundles, heating the sandwiched linear array of the boron fibers to a specific processing temperature which melts the polymeric matrix of the tow bundles; spreading the heated tow bundles across an impregnation bar assembly to encapsulate the linear array of boron fibers with the heated tow bundles and to shape the heated tow bundles to an initial width, wherein the encapsulated boron fibers are dispersed in a substantially uniform manner; pulling the shaped tow bundles using a drive mechanism, thereby enabling the polymeric matrix of the shaped tow bundles to consolidate fully into the hybrid boron-reinforced composite tape; and taking-up the consolidated hybrid boron-reinforced composite tape.

The present invention further includes an apparatus for producing a consolidated, hybrid boron-reinforced composite tape comprising a dispensing means for supplying at least one linear array of the boron fibers; an applying means for positioning a plurality of powder pre-impregnated fiber tow bundles along a length of the dispensed linear array of the boron fibers; a processing component for heating the positioned tow bundles and linear array of the boron fibers to a specific processing temperature which melts the polymeric matrix of the tow bundles and disperses boron fibers into the polymeric matrix, the processing component having an entrance and an exit, the processing component including an impregnation bar assembly positioned near the exit of the processing component for wetting-out the filament array of the heated tow bundles with boron fibers and for spreading the heated tow bundles with boron fibers to an initial width; a variable dimension forming nip means, positioned in operable relationship to the processing component, for shaping the heated precursor tape into a predetermined width, the variable dimension forming nip means being actively cooled and capable of imparting a selected pressure, wherein the hybrid boron reinforced polymer matrix composite tape is formed; a driving means, positioned in operable relationship to the variable dimension forming nip means, for pulling the shaped tow bundles with boron fibers, the driving means maintaining a constant speed across the width of the shaped tow bundles with boron fibers, thereby enabling the polymeric matrix of the shaped tow bundles with boron fibers to consolidate fully into the consolidated, boron-fiber-reinforced composite tape; and means for taking-up the boron-fiber-reinforced composite tape.

Additionally, the present invention includes a hybrid boron reinforced polymer matrix composition produced from the process comprising the steps of providing powder pre-impregnated fiber tow bundles; applying at least one linear array of boron fibers along the length of the powder pre-impregnated fiber tow bundles; heating the powder pre-impregnated fiber tow bundles and applied boron fibers to a specific processing temperature which melts the polymeric matrix of the heated powder pre-impregnated fiber tow bundles; and encapsulating the applied boron fibers with the powder pre-impregnated fiber tow bundles, wherein a hybrid boron reinforced polymer matrix composition is formed.

The method for manufacturing the hybrid boron reinforced polymer matrix composition begins with the powder pre-impregnated fiber tow bundles being mounted onto a pay-out creel for delivery. Concurrently, a linear array of boron fibers is dispersed and applied to the powder pre-impregnated fiber tow bundles. The spools of tow bundles are individually tensioned at this point to facilitate the alignment of the filaments of each bundle. This tensioning also aids in the spreading of the bundles in the processing component. The tow bundles are then fed through a collimation device to maintain the alignment of the individual tow bundles during processing. The collimation device ensures consistent thickness across the width of the processed material. If the alignment changes, a tape or ribbon will have an irregular shape and will not be a placeable grade tape, i.e., acceptable for use with the ATP process.

This alignment also facilitates the forming of the molten pre-preg or polymeric matrix into a precise shape and dimension. The bundles then proceed through the processing component. The processing component comprises two parts: an oven or furnace and an impregnation bar assembly. The oven is heated to a specific processing temperature for each individual polymeric matrix depending on the powdered resin of the tow bundles. Preferably, when processing requires a high temperature to melt the polymeric matrix material, an inert gas such as nitrogen is used as a process medium inside the oven to induce melting without oxidation. While still inside the oven, the tow bundles are pulled through the impregnation bar assembly. This assembly encapsulates or wets-out the filaments of the tow bundles and spreads the tow bundles to an initial width and shape. The tension which is created back at the pay-out creel is instrumental in this spreading process, with greater tension further assisting the spreading of the fiber tow.

Upon exiting the process component, the molten tow bundles with boron are fed through the variable dimension forming nip means having two rollers. The variable dimension forming nip means cools the molten tow bundles and shapes them into a precise, predetermined width. Preferably, the invention uses nitrogen as the cooling medium. Additionally, because the variable dimension forming nip means does not have a defined gap between the two rollers, the rollers allow for changes in powder content along the fiber tow bundles during processing by varying the cross-section along the length of the composite tape. Powder content can vary along the length of the towpreg as much as ±8% depending on the type process used to coat the clean tow bundles.

The next component is the self-contained driving means. The self-contained driving means pulls the total number of bundles and boron fibers needed to fabricate the tape through the process. The driving means maintains the speed of the process and removes any speed differential between the individual tow bundles. This constant speed in turn eliminates a shearing force which would create gaps and splits in the finalized tape. Thus, the driving means allows the resin content of the bundles to flow together. As a result, the method produces a fully-consolidated hybrid boron composite tape, which is spooled by a motorized take-up system.

DESCRIPTION OF THE PREFERRED EMBODIMENTS

The present invention includes an apparatus and method of manufacturing a hybrid boron reinforced polymer matrix composite tape. The hybrid boron reinforced polymer matrix composite tape is formed from powder pre-impregnated fiber tow bundles having boron fibers applied therein. The method provides significant advantages in decreasing void areas within the processed hybrid boron reinforced polymer matrix composite tape, while overcoming the difficulties of obtaining even distribution of the encapsulated boron fibers. The present invention provides excellent wet-out, proper fiber aerial weight, proper dispersion of boron fiber and good encapsulation of the boron fiber. These traits facilitate use of the hybrid composite tape for automated tow placement.

Figure 1:
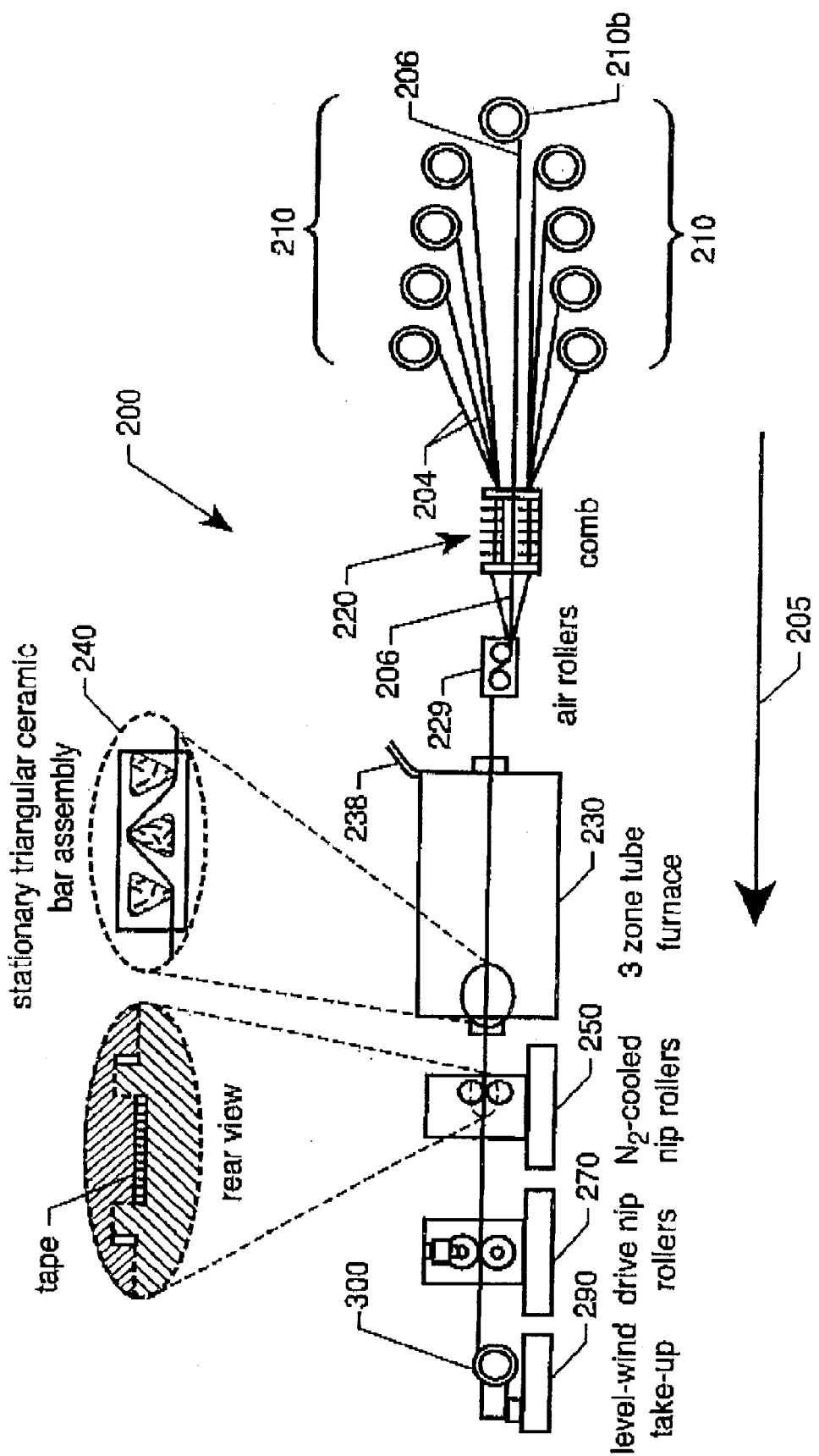
FIG. 1 is a side view of an apparatus for manufacturing the hybrid boron reinforced polymer matrix composite in accordance to the present invention.

Referring now to FIG. 1, an apparatus 200 for producing a fully consolidated, fiber-reinforced tape 300 from a plurality of powder pre-impregnated fiber tow bundles 204, or towpregs, with at least one array of boron fibers 206, in accordance to the present invention, is generally shown. The apparatus comprises six major components: a pay-out creel 210, a collimation means 220, a processing component 230, a variable-dimension forming nip means 250, a self-contained driving means 270, and a taking-up means 290. Each major component is positioned in operable relationship to its neighboring component. The direction of the process is shown by the vector 205.

Figure 8:
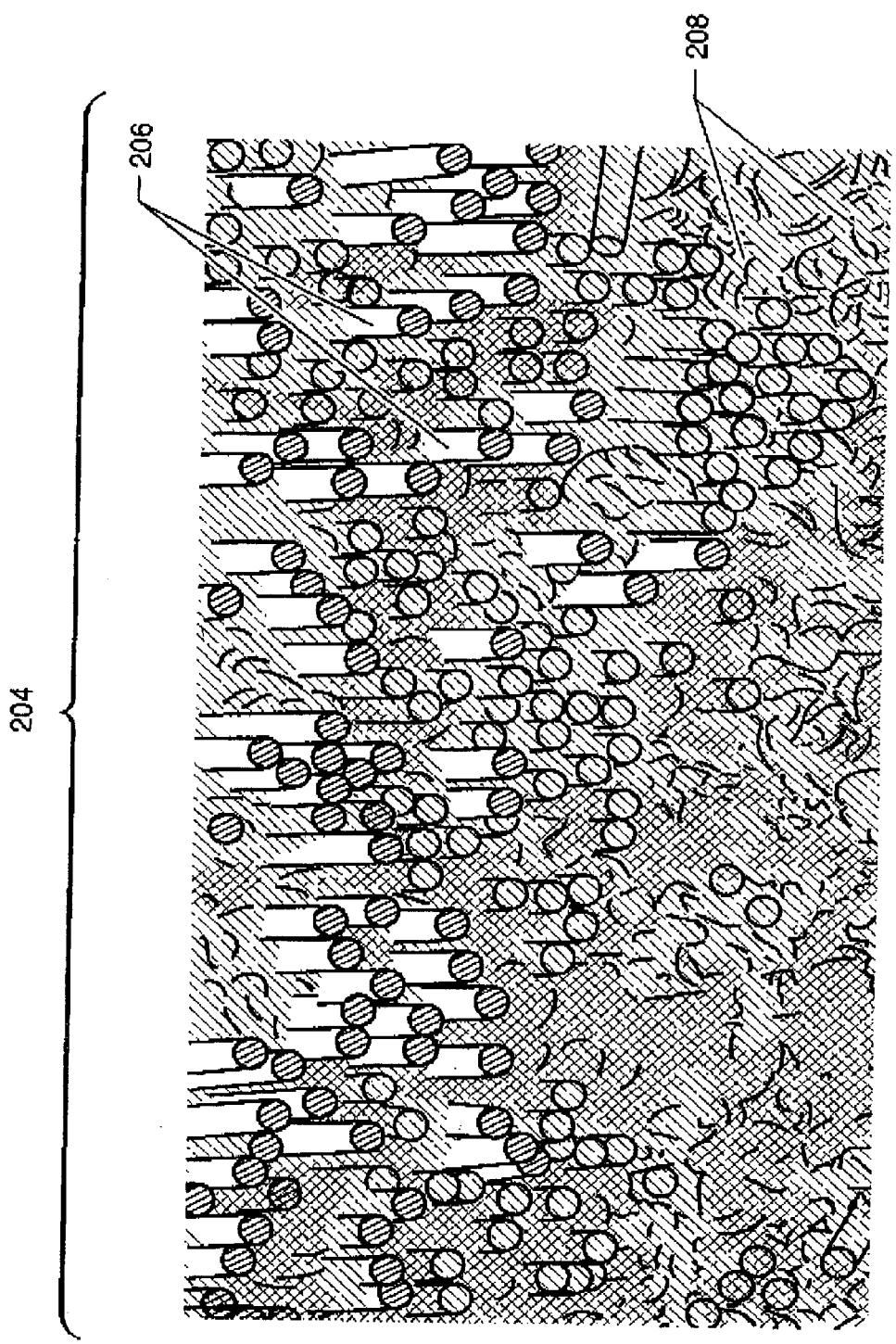
FIG. 8 is a cross-sectional view of a fractured fiber tow bundle of the present invention.

The process of the present invention begins by mounting a plurality of powder pre-impregnated fiber tow bundles 204 onto the pay-out creel 210 for delivery to the collimation means 220. Concurrently with the feeding of the powder pre-impregnated fiber tow bundles 204, a linear array of boron fibers 206 is fed from an additional pay-out creel 210B. As is generally represented in FIG. 8, each fiber tow bundle 204 comprises a plurality of continuous filament arrays 207 (typically composed of 6,000 to 12,000 filaments) which have been previously impregnated with some melt-processible polymeric matrix 208. Impregnation methods include: 1) dry-powder prepregging, 2) slurry powder prepregging, 3) solution dip-pan prepregging, and 4) hot-melt prepregging. Before beginning the process of this invention, the powder pre-impregnated fiber tow 204 is partially unconsolidated with some volume percentage occupied by air or other gaseous voids. The voids are a consequence of the towpreg quality and type of manufacturing technique and are commonly accepted to occupy a range of shapes (i.e., spheres/particles).

Figure 9:
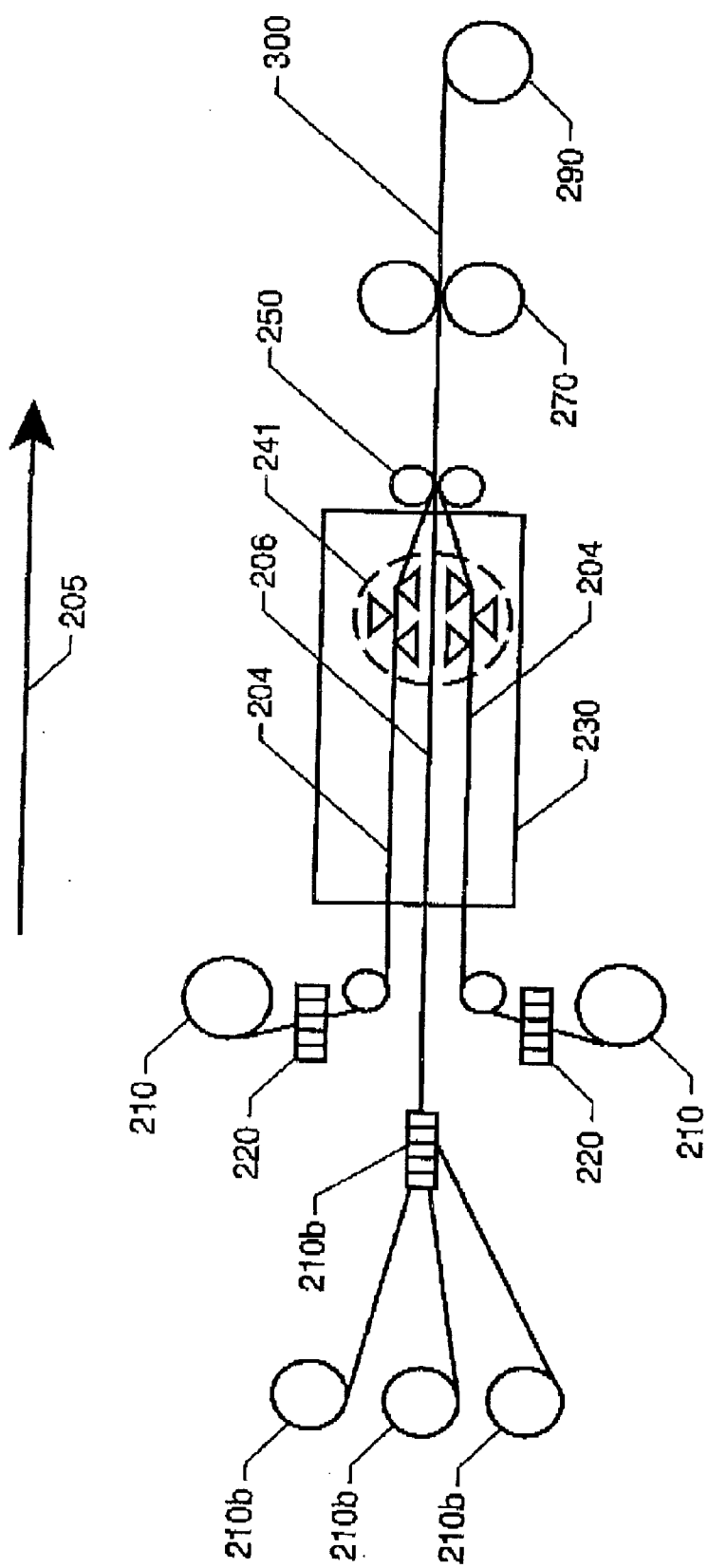
FIG. 9 is a side view of an alternative embodiment of the present invention.

Referring to FIGS. 1 and 9, the boron component/fibers 206 of the present invention are distributed evenly in at least one array across the width of the powder pre-impregnated fiber tow bundles. Various techniques for supplying an array of boron fibers 206 across the width of the fiber tow bundles exist, including a uniweave, wherein a thin polymer filament is weaved through the boron fibers; a cohesive tape, where the boron fibers are bonded into an array with a solution of polymeric adhesive or other binder/adhesive; and mechanical applicators, such as a payout creel 210B with a collimating device 220B as shown in FIG. 9.

Boron fibers include various forms of boron, including uniform and non-uniform shape, texture, size, etc. The amounts of the boron fibers incorporated into the hybrid boron reinforced polymer matrix composition may be varied according to design specifications and anticipated end use, particularly with regard to increased compressive properties, with the amount of boron fiber being determinable by those skilled in the art. Preferably, the boron fibers are approximately 0.004 inches in diameter. The amounts of boron fibers preferably range from about one end per inch to about 200 ends per inch, more preferably range from about 20 ends per inch to about 100 ends per inch, and most preferably range from about 25 ends per inch to about 50 ends per inch. A plurality of linear arrays of boron fibers may be used. In one embodiment, the boron-fiber reinforced composition may comprise a 0.250 inch wide and 0.005 inch thick ribbon containing 40 boron fibers uniformly distributed across the width of the ribbon. A hybrid boron reinforced polymer matrix composition is particularly useful in applications requiring high compressive strength, such as landing gear applications. Other uses of the present invention are in any area which requires use in elevated temperatures or with weight constraints.

Figure 2:
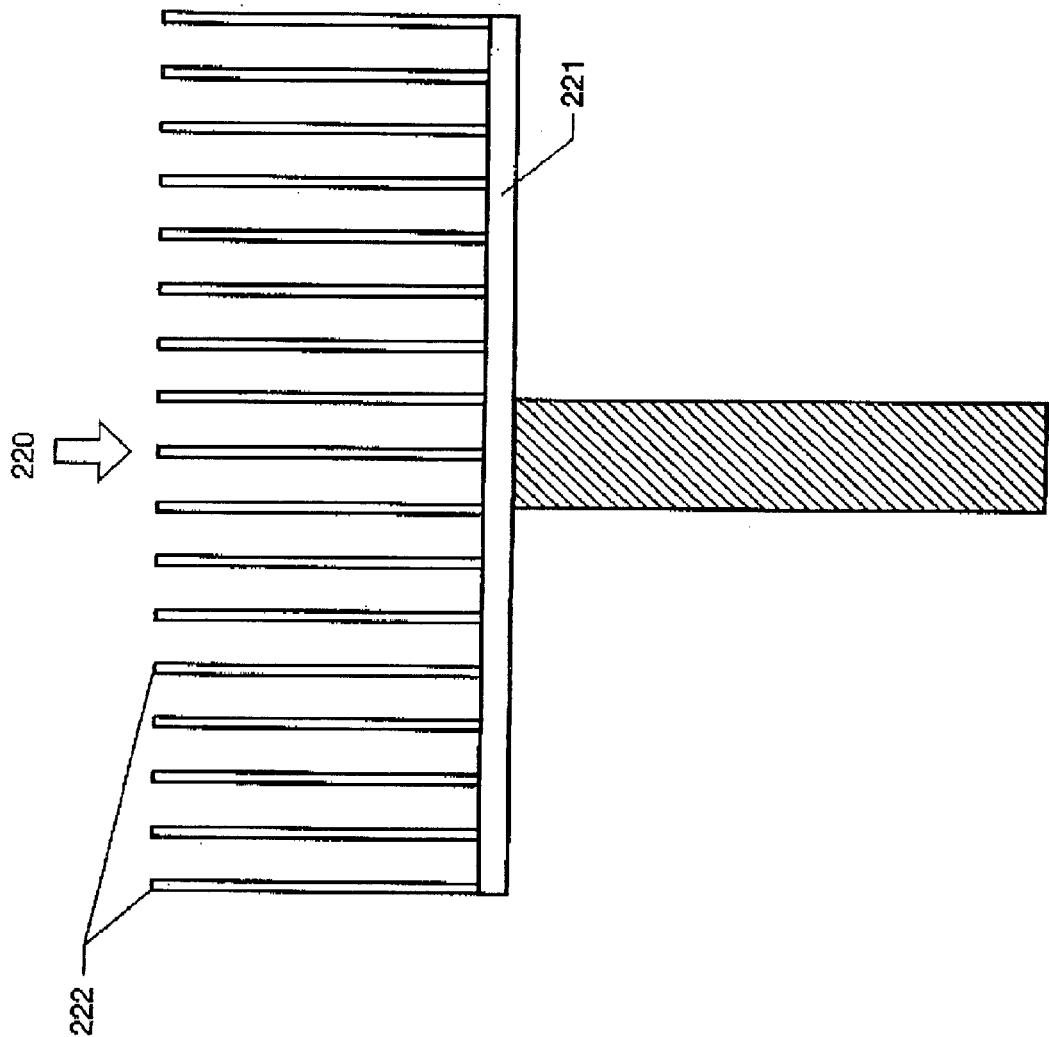
FIG. 2 is a front view of a variable height collimation device in accordance to the present invention.
Figure 3:
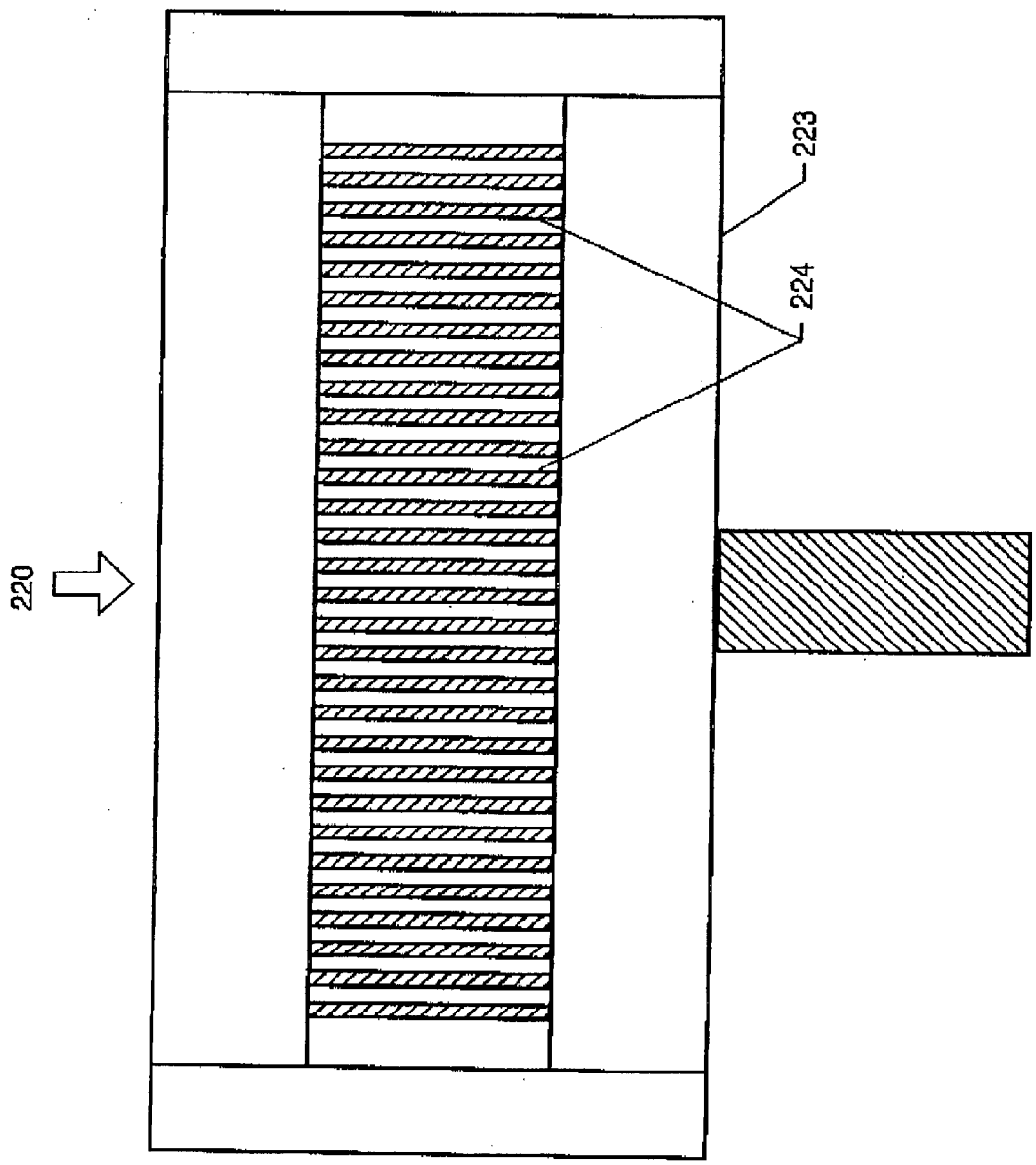
FIG. 3 is a front view of an alternative embodiment of the collimation device of the present invention.

Referring now to FIG. 2, one embodiment of the collimation means 220 is a variable height collimation device comprising a comb 221 having a plurality of teeth 222. Generally two combs 221 are used. Alternatively, as illustrated in FIG. 3, the collimation means 220 may embody a low-friction collimation device which comprises a frame 223 having a plurality of rotating ceramic bars or spindles 224. The collimation means 220 aligns the fiber tow bundles 204 and linear array of boron fibers 206 laterally during processing and also maintains this alignment, which facilitates a consistent thickness across the width of the processed material.

The process continues as shown in FIG. 1 with the fiber tow bundles 204 and linear array of boron fibers 206 passing through a set of air rollers 229 where the linear array of boron fibers 206 becomes applied to and sandwiched between the powder pre-impregnated fiber tow bundles 204 to maintain physical contact between the linear array of boron fibers 206 and the powder pre-impregnated fiber tow bundles 204. Additionally, the air rollers 229 align the powder pre-impregnated fiber tow bundles 204 and linear array of boron fibers 206. After the powder pre-impregnated fiber tow bundles 204 and applied linear array of boron fibers 206 have passed the air rollers 229, the powder pre-impregnated fiber tow bundles 204 and linear array of boron fibers 206 enter a heating stage or processing component 230 that heats both the aligned powder pre-impregnated fiber tow bundles 204 and the boron fibers 206.

Figure 4:
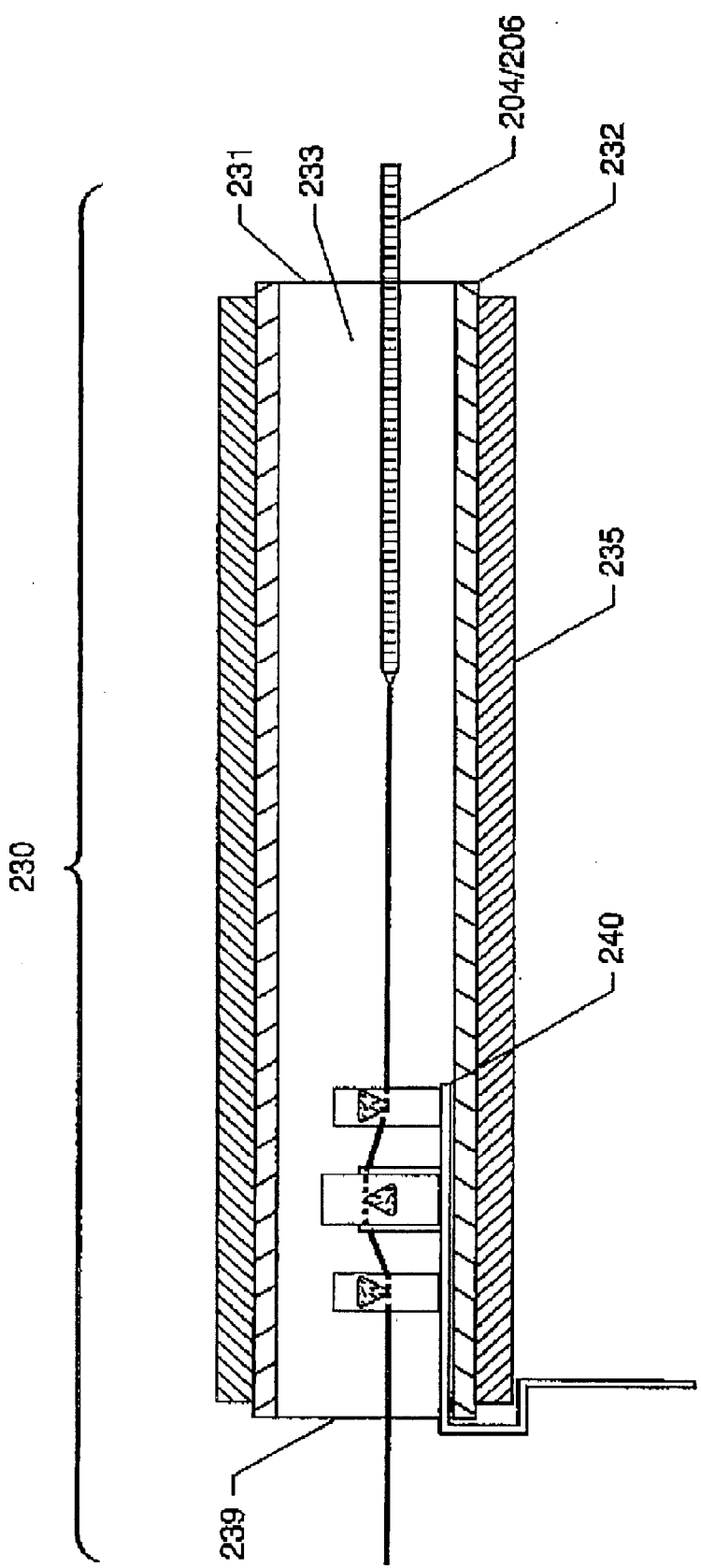
FIG. 4 is a side view of the processing component of the present invention.

Referring now to FIGS. 1 and 4, the processing component 230 comprises a melting chamber 233 and an impregnation bar assembly 240, both of which are housed within a tube furnace or oven 235 having a steel tube liner 232. The oven 235 is heated to a specific processing temperature for each individual polymeric matrix depending on the powdered resin of the tow bundles. Preferably, when processing requires a high temperature to melt the polymeric matrix material, an inert gas such as nitrogen, supplied by a gas line 238 as indicated in FIG. 1, is used as a process medium inside the oven to induce melting without oxidation. Also preferably, the oven 235 comprises a three-zone furnace with a steel liner. However, any oven which raises the temperature in the melting chamber 233 to the melting point of the polymeric matrix will suffice.

The melting chamber 233 is located within and is first encountered at the entrance 231 to the oven. Within the melting chamber 233, the polymeric matrix of the prepreg material 204 melts from the solid phase to a viscous liquid phase, which causes a liquid wetting phenomenon, reducing the void content and resulting in a slight neck-down region 207 on the prepreg material. The continuous filament array component of the prepreg material 204 remains solid and continues to support 100% of the pulling tension. Near the exit 239 of the oven is the impregnation bar assembly 240.

Figure 5A:
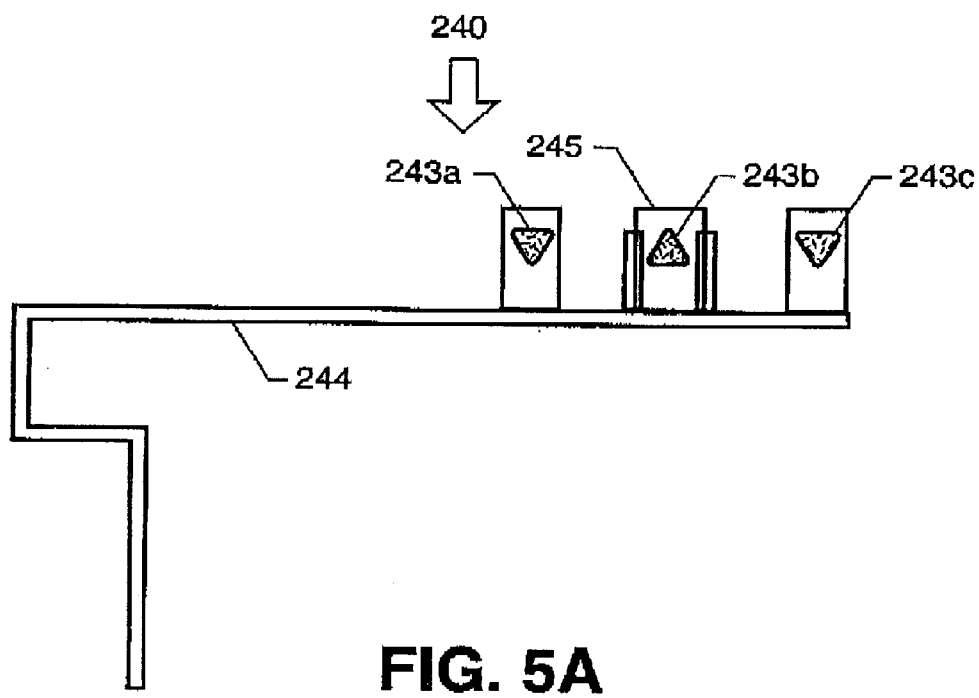
FIG. 5A is a side view of the bar assembly of the present invention.
Figure 5B:
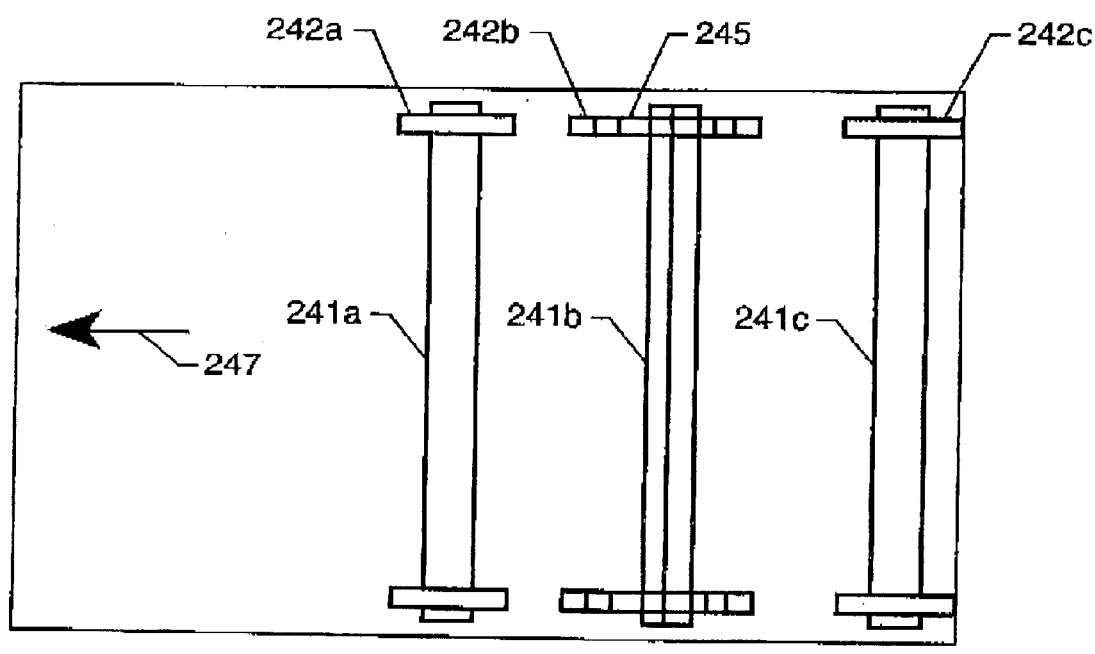
FIG. 5B is a top view of the bar assembly of the present invention.

Referring now to FIGS. 5A and 5B, the impregnation bar assembly 240 comprises a bar fixture 244, a plurality of bar uprights 242a, 242b, 242c, and a plurality of bars 241a, 241b, 241c fixed substantially perpendicular to the axial direction of the fiber tow bundles, which is represented by the vector 247. Preferably, the number of stationary bars is three and the cross-sectional shape of each bar is substantially triangular. Each bar 241a, 241b, 241c is oriented sequentially in series to the direction 247 of the tow bundles. The tow bundles are pulled through the impregnation bar assembly 240 in such a manner as that each bar contacts the tow bundles at a cross-sectional apex 243a, 243b, 243c of each bar. Either sequential pathway of the tow bundles through the bars, under-over-under (shown in FIG. 4), or over-under-over (not shown), will produce a good result. The impregnation bar assembly 240 further comprises an adjustable bar holder 245, which adjusts the height of the middle bar 241b relative to the other two bars 241a and 241c. Once a predetermined position of the bar holder 235 is selected, the height of the middle bar 241b remains stationary during the course of the manufacturing process. Changing the height of the middle bar effectively changes the wrap angle of the impregnation bar assembly 240.

The bars may be constructed of materials which maintain structural integrity at temperatures above the processing temperature of the polymeric matrix of the prepreg material. Some examples of materials which may be used for the bars include: polished quartz, bulk carbon graphite, and ceramic such as partially stabilized zirconia (PSZ). The geometry of the bars and the bar uprights controls the resulting pressure gradients which are applied to the prepreg material by the impregnation bar assembly 240. The geometry can be adjusted to affect the pressure gradients. Examples of such adjustments and the effects include: 1) increasing the bar surface curvature radius decreases the applied pressure gradients; 2) increasing the center line distance between each contact radius center of each stationary bar decreases the applied pressure gradients; 3) increasing the wrap angle defined by the center line and the fiber tow bundles increases the applied pressure gradients. The application of these pressure gradients allows for the expulsion of voids and the re-distribution of the polymeric matrix and the filaments, a process known in the art as wetting-out. This process causes the heated fiber tow bundles and the boron fibers to begin forming into a consolidated, wide, flat shape.

After the heated fiber tow bundles exit the impregnation bar assembly 240, the polymeric matrix of the prepreg material is in a transition from a viscous liquid to a state described as a malleable plastic solid. The boron fibers that were applied to the fiber tow bundles are encapsulated into the polymeric matrix of the prepreg material and dispersed therein. The heated fiber tow bundles with the encapsulated boron fibers 207 then enter the variable-dimension forming nip means 250. As shown in FIG. 1, the forming nip means 250 is placed in an operable relationship to the processing component 230. This relationship allows enough distance from the processing component 230 for the polymeric matrix to remain molten upon entrance into the forming nip means.

Figure 6:
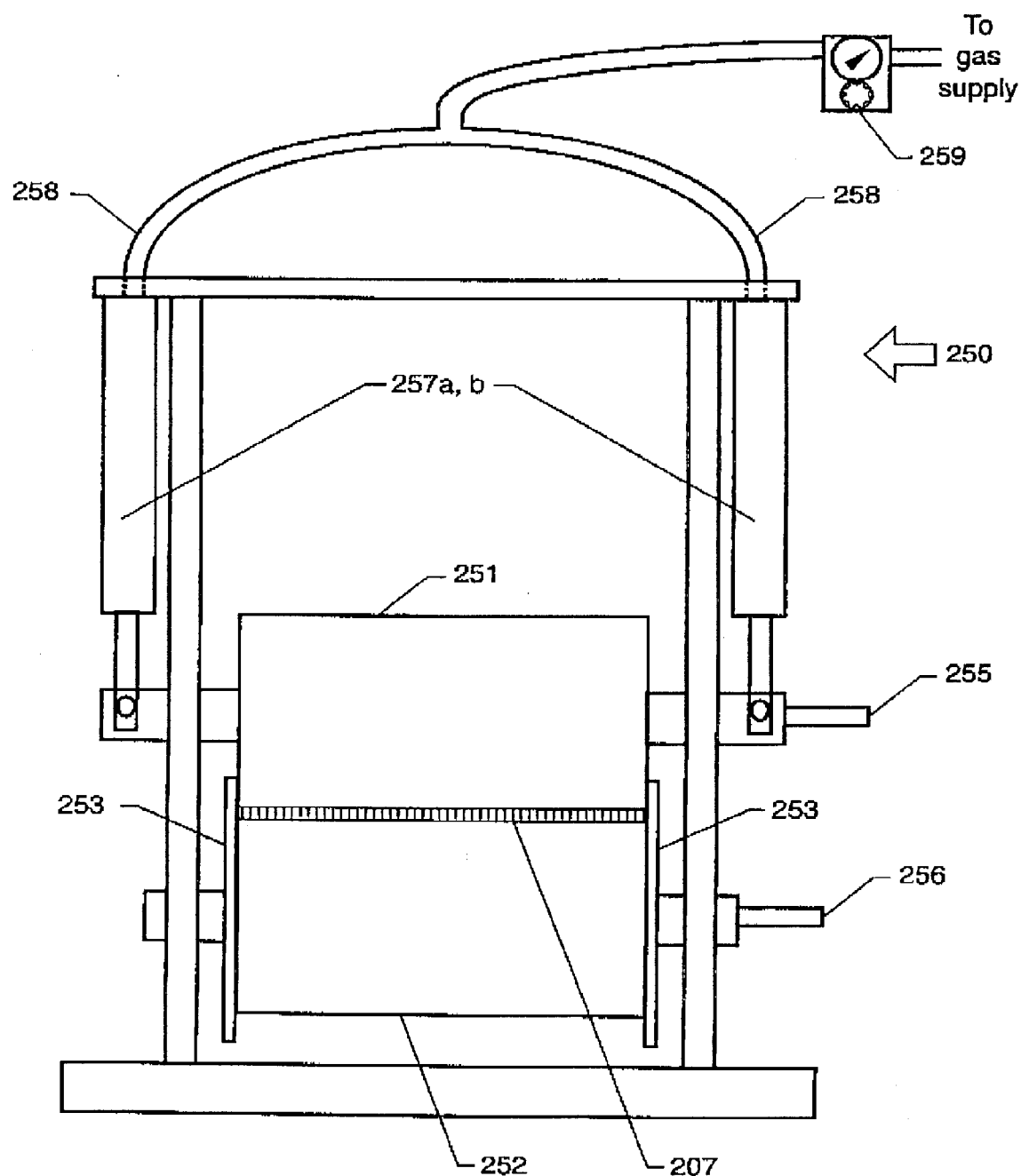
FIG. 6 is a front view of the variable-dimension shaping means of the present invention.

As indicated in FIG. 6, the variable-dimension forming nip means 250 is a variably-loaded, surface-cooled nip-roller apparatus. The forming nip means comprises two nip-rollers 251, 252 whose surfaces are actively cooled under forced convection via load bearing shafts 255, 256 which are connected to a cooling medium. Preferably, the cooling medium is nitrogen. A variable-loading means 257a, 257b variably loads the floating roller 251 against the fixed roller 252. Preferably, the variable loading means 257a, 257b is a pair of pneumatic air cylinders connected to an air line 258. A pressure regulator 259 selects and adjusts the consolidation pressure exerted by the rollers 251, 252 onto the heated tow bundles with encapsulated boron fibers 207. Alternatively, other types of loads, such as a spring load, may also be employed. The variable loading allows for passing of anomalies, such as filament balls, in the heated fiber tow bundles. More importantly, because the nip rollers 251, 252 do not have a defined gap between them, the rollers allow for a variable thickness along the length of the heated tow bundles with encapsulated boron fibers 207. This variable thickness along the length of the tow bundles with encapsulated boron fibers 207 occurs because of changes in powder content, which can vary as much as ±8% depending on the type of process used for coating. During periods when the powder content of the fiber tow drops below the average amount, the variable-dimension forming nip means 250 still produces a well-consolidated tape because the floating roller 251 adjusts to apply the same pressure against the thinner thickness of encapsulated fibers 207.

Under the load applied by the loaded nip-rollers 251, 252 and the thermal gradient imposed by the cool roller surfaces, the molten plastic undergoes transition to a solid elastic state and the heated tow bundles with encapsulated boron fibers 207 are shaped to a precise width as determined by the location of flanges 253, which connect to the ends of the fixed roller 252. An advantage to having the nip-rollers cool is that no release paper is required. The hot sticky polymer melt is quickly solidified ($1/10$ to $1/1000$ second) on contact with the cool nip-rollers. The space between the flanges 253 which is used to form the final width of the consolidated composite tape may be dimensioned for a variety of widths. A spacing of three inches provides excellent results, although any width could be fabricated. The shaped tow bundles with encapsulated boron fibers 207 are consolidated and their cross-section is uniform along their length and width.

Figure 7:
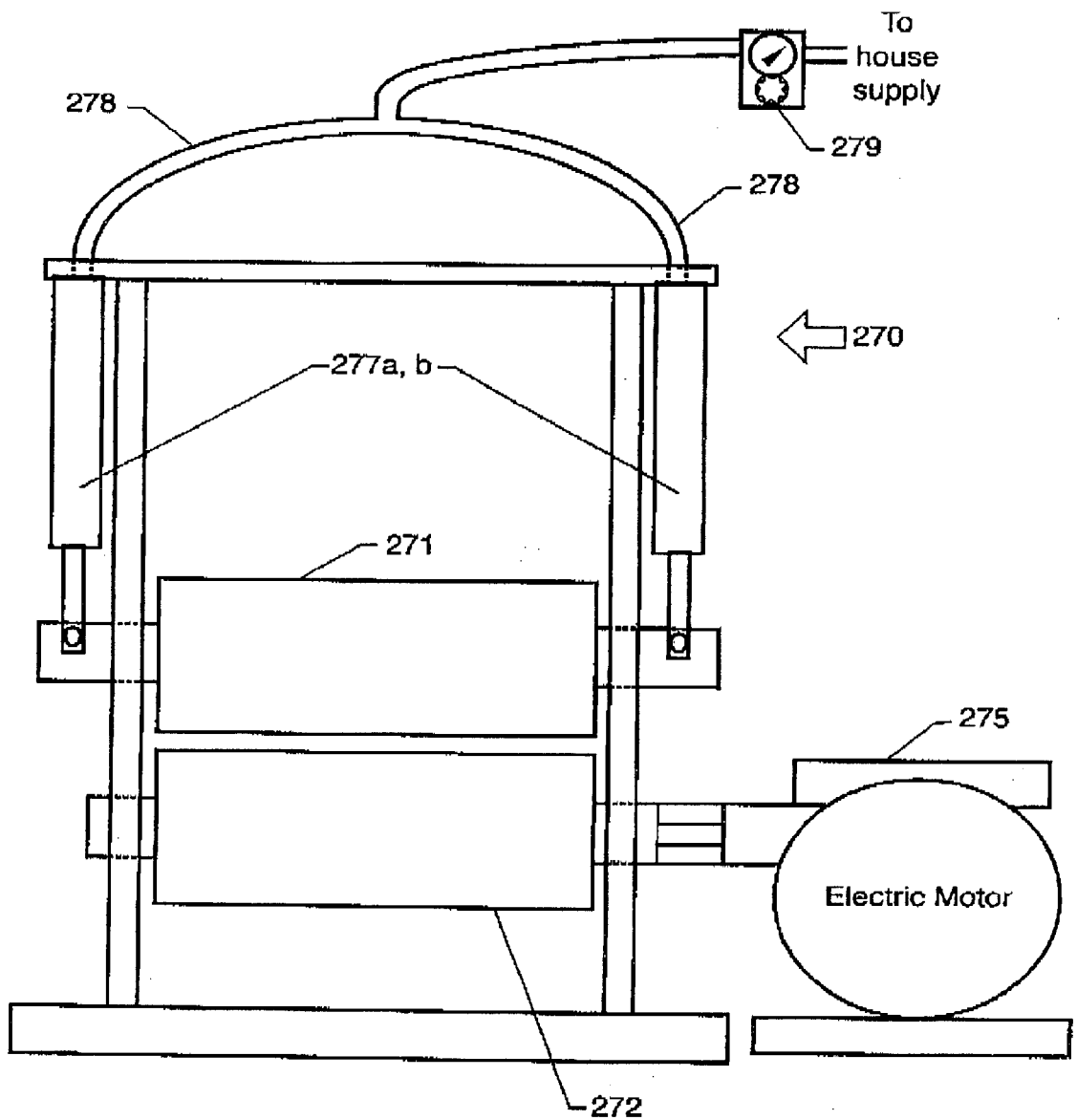
FIG. 7 is a front view of the self-contained driving means of the present invention.

Referring now to FIG. 7, a self-contained driving means 270 comprises a pair of opposing rollers 271, 272, an electric motor 275, and a pair of variable loading means 277a, 277b. The variable-loading means 277a, 277b variable loads the floating roller 271 against the fixed roller 272. Preferably, the variable loading means 277a, 277b is a pair of pneumatic air cylinders connected to an air line 278. A pressure regulator 279 selects and adjusts the consolidation pressure exerted by the rollers 271, 272 onto the consolidated, hybrid boron reinforced composite tape 300. Alternatively,. other types of loads, such as a spring load, may also be employed.

The self-contained driving means 270 pulls the total number of tow bundles needed to fabricate the composite tape 300 through the process and also maintains a constant speed for the process by eliminating any speed differential cross-sectionally between the individual tow bundles. Any differential in speed between individual tows will cause gaps and splits in the tape to occur. Thus, this constant speed further assists the molten polymeric matrix of the tow bundles to flow together better over greater widths than processes given by the related art. As shown in FIG. 1, the process finishes with a fully-consolidated hybrid boron-fiber reinforced composite tape 300, which is spooled by the motorized taking-up means 290.

An alternative method for fabricating the composite tape 300 is shown in FIG. 9, which illustrates a dual bar assembly 241. Like parts are referenced with identical numbers. The dual bar assembly 241 comprises two sets of the impregnation bar assembly 240, each having a similar design as previously described. As with the impregnation bar assembly 240, the dual bar assembly 241 serves to wet-out each heated fiber tow bundle 204 it receives. With this alternative method, the linear array of boron fibes 206 is sandwiched and pressed between the heated fiber tow bundles 204 at the variable-dimension forming nip means 250.

While both FIGS. 1 and 9 show the array of boron fibers 206 being sandwiched between two layers of fiber tow bundles 204, another alternative method for fabricating the composite tape 300 comprises applying the plurality of fiber tow bundles 204 along only one side of the dispensed array of boron fibers 206. As with the previous process which applied fiber tow bundles on both sides of the boron fibers, this alternative method applies and presses the fiber tow bundles 204 and the boron fibers 206 together either at the rollers 229 before entry into the processing component 230, or at the variable-dimension forming nip means 250 after exit from the processing component 230.

The process of this invention provides the manufacture of fully-consolidated hybrid boron composite tapes from various towpregs, including the thermoplastics PIXA-M, and the lightly c ross-linking thermoplastic LaRC™PETI-5. Other materials that are able to be processed on the line include almost all thermoplastics and thermosets, including epoxies and bismaleimides.

EXAMPLE 1

An array of 25 boron fibers is sandwiched between two 6K AS4 carbon fiber powdered coated tows and then is passed through the ribbonizer. The 25 ends of boron fiber are collimated into a tape, placed on a creel and are processed as shown in FIG. 1. The creel delivers the boron fibers as a 0.225 inch flat array of adjacent fibers. The two 6K AS4 PIXA coated (57% resin) tows are delivered from the creel with one above and one below the boron fiber array. The complete tow with the applied boron fibers is passed over the impregnation bars and through the two sets of rollers, making a 0.250 inch hybor ribbon. The stationary bars are constructed of partially stabilized zirconia (PSZ). The bars are heated with a three zone furnace to 460° C. and allowed to equalize for 1 hour. The cooled, forming nip-roller apparatus is cooled by forcing gaseous nitrogen through a dry ice and acetone bath and then into the forming component at 20 PSI. The consolidation pressure is applied with pneumatic cylinders and is maintained at 88 pounds of force. The spacing of the flanges on the forming nip means allows for a finished part with a cross-section defined by 0.250 inches wide by 0.005 inches thick. The take-up rate is set at a constant 30 feet per minute. The powder coated carbon fiber and boron array are threaded through the apparatus, with the tension being applied at the creel set to 200 grams. The resulting tape is of excellent quality and consistency along its entire length, having a void content of less than 1% per volume.

EXAMPLE 2

The apparatus and method of the present invention is used to convert a fully imidized polyimide powder-coated array of carbon fiber tows of LaRC™PETI-5 into a uniform, solid, consolidated, unidirectional, continuous, polymeric composite tape. A linear array of boron fibers is sandwiched and then encapsulated by the array of powder coated carbon tows. The impregnation bar assembly has two sets of bars as shown in FIG. 9, one above the other, with a wrap angle of 83°. The stationary bars is constructed of partially stabilized zirconia (PSZ). The bar surface temperature is 480° C., which is achieved by passive heating from the processing component and was stabilized within 1 hour. The cooled, forming nip-roller apparatus is cooled by forcing gaseous nitrogen through a dry ice and acetone bath and then into the forming component at 20 PSI. Pneumatic cylinders maintained at 125 pounds of force apply the consolidation pressure. The spacing of the flanges on the forming nip means allows for a finished part with a cross-section defined by 3 inches wide by 0.005 inches thick. The take-up rate is set at a constant 25 feet per minute. The powder coated tows and boron array are threaded through the apparatus and the tension being applied at the creel was set to 100 grams. The resulting tape is of excellent quality and consistency along its entire length. In general, the tape seems well-consolidated and breaks cleanly (a test for consolidation quality). In the initial runs, thirteen (13) powder coated tows are used on the top and bottom to encapsulate the boron array. Upon clean-up, the impregnation bars are inspected for damage, and reused if appropriate.

The foregoing summary, description, examples and drawings of the present invention are not intended to be limiting, but are only exemplary of the inventive features which are defined in the claims.

We claim:

1. A method of producing a boron-fiber reinforced composite tape, comprising steps for:
   (a) dispensing at least one array of boron fibers;
   (b) applying a plurality of fiber tow bundles, said fiber tow bundles being pre-impregnated with a polymeric matrix, along at least one side of at the at least one dispensed array of boron fibers;
   (c) heating the at least one dispensed array of boron fibers and the applied plurality of fiber tow bundles to a specific processing temperature which melts the polymeric matrix of the fiber tow bundles;
   (d) wetting-out the heated at least one array of boron fibers and plurality of fiber tow bundles into an intial consolidated flat shape, wherein the heated at least one array of boron fibers are encapsulated within the plurality of fiber tow bundles so as to become a boron-reinforced composite tape;
   (e) re-shaping the consolidated flat boron-reinforced composite tape into a pre-determined width; and
   (f) spooling the consolidated, boron-reinforced composite tape.

2. The method of claim 1, wherein the plurality of fiber bundles comprises carbon fiber.

3. The method of claim 1, wherein the step for dispensing at least one array of boron fibers comprises using a pay-out creel for delivery of the at least one array of boron fibers.

4. The method of claim 1, wherein the step for dispensing at least one array of boron fibers comprises dispersing a plurality of linear arrays of boron fibers.

5. The method of claim 4, further comprising a step for mounting a plurality of linear arrays of boron fibers on a pay-out creel for delivery.

6. The method of claim 1, wherein the at least one array of boron fibers comprises boron fibers supported by polymeric thread.

7. The method of claim 1, wherein the at least one array of boron fibers comprises boron fibers supported by an adhesive.

8. The method of claim 1, wherein the step for heating employs an inert gas environment.

9. The method of claim 8, wherein the inert gas is nitrogen.

10. The method of claim 1, wherein the pre-determined width of the composite tape is approximately three inches.

11. A method of producing a boron-fiber reinforced composite tape, comprising steps for:
   (a) supplying at least one array of boron fibers;
   (b) supplying at least one array of fiber tow bundles, each fiber tow bundle being pre-impregnated with a polymeric matrix;
   (c) heating the at least one array of fiber tow bundles so as to melt the polymeric matrix of the fiber tow bundles;
   (d) wetting-out the melted polymeric matrix of the fiber tow bundles; and
   (e) pressing the heated fiber tow bundles and the at least one array of boron fibers together to encapsulate the boron fibers within the melted polymeric matrix, whereby a consolidated boron fiber reinforced composite tape is formed.

* * * * *

UNITED STATES PATENT AND TRADEMARK OFFICE
CERTIFICATE OF CORRECTION

PATENT NO. : 6,500,370 B1
DATED : December 31, 2002
INVENTOR(S) : Harry L. Belvin et al.

It is certified that error appears in the above-identified patent and that said Letters Patent is hereby corrected as shown below:

<u>Column 1,</u>
Line 57, replace "disclosed by Sandusky in U.S. Pat. Nos. 5,395,47. Sandusky" with -- disclosed by Sandusky in U.S. Pat. No. 5,395,477. Sandusky --.

Signed and Sealed this

Second Day of September, 2003

JAMES E. ROGAN
*Director of the United States Patent and Trademark Office*